United States Patent
Ogasawara

(10) Patent No.: US 9,832,331 B2
(45) Date of Patent: Nov. 28, 2017

(54) IMAGE READING APPARATUS AND IMAGE FORMING APPARATUS

(71) Applicant: CANON KABUSHIKI KAISHA, Tokyo (JP)

(72) Inventor: Akio Ogasawara, Tsukubamirai (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/155,906

(22) Filed: May 16, 2016

(65) Prior Publication Data

US 2016/0360057 A1 Dec. 8, 2016

(30) Foreign Application Priority Data

Jun. 5, 2015 (JP) .................................. 2015-114754

(51) Int. Cl.
*H04N 1/04* (2006.01)
*H04N 1/00* (2006.01)

(52) U.S. Cl.
CPC ....... *H04N 1/00795* (2013.01); *H04N 1/0057* (2013.01); *H04N 1/00615* (2013.01); *H04N 1/00909* (2013.01)

(58) Field of Classification Search
CPC ....... H04N 2201/0081; H04N 1/00588; H04N 1/00602; H04N 1/12; H04N 1/0057; H04N 1/00615; H04N 1/00718; H04N 2201/0093
USPC ............... 358/474, 496, 497, 486; 271/14.6; 399/367
See application file for complete search history.

(56) References Cited

U.S. PATENT DOCUMENTS

| | | | | |
|---|---|---|---|---|
| 4,474,457 A | * | 10/1984 | Phelps | G03G 15/605 355/75 |
| 5,436,696 A | * | 7/1995 | Orlowski | G03G 15/75 399/159 |
| 5,873,012 A | * | 2/1999 | Miyabe | G03G 21/1825 399/111 |
| 6,069,715 A | * | 5/2000 | Wang | H04N 1/00538 358/474 |
| 6,721,074 B1 | * | 4/2004 | Kao | H04N 1/2032 271/160 |
| 7,616,353 B2 | | 11/2009 | Yamanaka et al. | 358/474 |

(Continued)

FOREIGN PATENT DOCUMENTS

JP 2005-184069 A 7/2005
JP 2005-184069 A5 12/2006

(Continued)

OTHER PUBLICATIONS

U.S. Appl. No. 15/169,366, filed May 31, 2016.

*Primary Examiner* — Negussie Worku
(74) *Attorney, Agent, or Firm* — Fitzpatrick, Cella, Harper & Scinto

(57) ABSTRACT

An image reading apparatus includes first and second image reading units, and first and second transparent guides disposed along a conveyance path and guiding a document passing through a conveyance path. The first and second transparent guides are disposed to oppose to each other across the conveyance path. The image reading apparatus also includes a grounding portion provided on one of the first and second transparent guides and a conductive portion electrically connecting the first and second transparent guides with each other.

13 Claims, 15 Drawing Sheets

(56) References Cited

U.S. PATENT DOCUMENTS

| | | | | |
|---|---|---|---|---|
| 8,270,875 B2* | 9/2012 | Fujita | ................ | G03G 15/1605 |
| | | | | 399/124 |
| 8,405,888 B2* | 3/2013 | Fukutome | .......... | H04N 1/00002 |
| | | | | 358/474 |
| 8,416,476 B2* | 4/2013 | Tamehira | ............. | G03G 15/605 |
| | | | | 271/110 |
| 8,561,982 B2* | 10/2013 | Ogasawara | ............. | B65H 5/26 |
| | | | | 271/186 |
| 8,665,503 B2* | 3/2014 | Yoshimoto | ........... | G03G 15/605 |
| | | | | 358/408 |
| 9,511,936 B2* | 12/2016 | Uno | ....................... | H04N 1/121 |
| 2009/0185238 A1* | 7/2009 | Wu | .................... | H04N 1/00909 |
| | | | | 358/474 |
| 2012/0314267 A1* | 12/2012 | Suzuki | ................ | G03G 15/607 |
| | | | | 358/498 |
| 2015/0117876 A1* | 4/2015 | Michishita | ............ | G03G 21/06 |
| | | | | 399/24 |
| 2015/0331381 A1* | 11/2015 | Kobayashi | ............... | H04N 1/00 |
| | | | | 358/1.13 |
| 2016/0170363 A1* | 6/2016 | Kogure | ............. | G03G 15/6558 |
| | | | | 399/316 |

FOREIGN PATENT DOCUMENTS

| | | |
|---|---|---|
| JP | 4235543 B2 | 3/2009 |
| JP | 2011-151594 | 8/2011 |
| JP | 4869409 B2 | 2/2012 |

\* cited by examiner

IMAGE READING APPARATUS AND IMAGE FORMING APPARATUS

BACKGROUND OF THE INVENTION

Field of the Invention

The present invention relates to an image reading apparatus and an image forming apparatus including the image reading apparatus.

Description of the Related Art

Conventionally, some image reading apparatus for use in an image forming apparatus such as a scanner, a printer, and a copier read an image of a document while conveying the document by an auto document feeder (referred to as an 'ADF' hereinafter). The image reading apparatus reads the document by an image reading unit while conveying the document between a platen roller and a transparent guide.

In the image reading apparatus, however, there is a case when foreign matters such as toner powder, paper dust, and rubber dust generated in conveying the document are electrostatically attracted to and trapped on the transparent guide. If the foreign matters are happened to stay at a document reading position of the image reading unit in that case, the image reading unit reads the foreign matters while reading the document only to generate striped images (streaky image defect). Then, U.S. Pat. No. 7,616,353 discloses a configuration in which a conductive member is provided on a transparent guide to prevent the transparent guide from being electrostatically charged so as to prevent such image defect.

Meanwhile, U.S. Pat. No. 8,416,476 discloses an image reading apparatus in which an image reading unit is provided within an ADF besides an image reading unit provided on a side of an image reading apparatus body (referred to as a 'reading apparatus body' hereinafter), so as to simultaneously read both surfaces of a document being conveyed.

Here, when such a conventional image reading apparatus reads simultaneously the both surfaces of the document, the document is conveyed while sliding the transparent guides respectively provided in the reading apparatus body and the ADF. Then, as shown in FIG. 15, a part of the foreign matters G conveyed together with the document D is frictionally slid between the document D and the transparent guide 401 of the reading apparatus body or the transparent guide 501 of the ADF, and is electrostatically trapped on the transparent guide 401 or 501.

After that, while the document D is conveyed through a gap between the transparent guides 401 and 501 facing each other, the foreign matters G remains electrostatically trapped on the transparent guides 401 and 501. If the foreign matters G is happened to be located at document reading positions of the image reading units 402 and 502 in the reading apparatus body and the ADF, the image reading units 402 and 502 might read the foreign matters G in reading the image from the document D, thus generating striped images.

Then, some of the conventional image reading apparatus are provided with a conductive member 403 such as an aluminum sheet pasted on the transparent guide 401 of the reading apparatus body from a front surface to a back surface thereof with a conductive double-sided tape 404. The conductive member 403 is electrically connected with a casing 405 of the grounded reading apparatus body through the conductive double-sided tape 404. A conductive member not shown is also pasted on the transparent guide 501 of the ADF, and an elastic wire (ground line) or the like composed of conductive material is connected to the conductive member. The elastic wire rod is guided by a bundled wire guide within the ADF and is connected to the casing 405 of the reading apparatus body. Thus, the transparent guide 501 is grounded.

In the case of grounding the transparent guide 501 on the ADF side as described above, however, it is necessary to dispose a guide component for restricting the ground line to wire the ground line within the ADF and to pass the line to the image forming apparatus body (referred to as an 'apparatus body' hereinafter), and a length of the ground line needs to be considerably prolonged. As a result, not only it necessitates a complicated configuration for grounding the transparent guide, but also both cost and size of the image reading apparatus may increase.

SUMMARY OF THE INVENTION

According to one aspect of the invention, an image reading apparatus includes a first image reading unit configured to read an image of a first surface of the sheet passing through the conveyance path, a second image reading unit provided on an opposite side to the first image reading unit across the conveyance path and configured to read an image of a second surface opposite to the first surface of the sheet, a first transparent guide disposed along the conveyance path such that the first image reading unit reads the image on the first surface through the first transparent guide, a second transparent guide disposed along the conveyance path to oppose to the first transparent guide across the conveyance path such that the second image reading unit reads the image on the second surface through the second transparent guide. The first and second transparent guides each includes a guide surface coated with conductive material and guiding the sheet passing through the conveyance path. The image reading apparatus further includes a grounding portion provided in one of the first and second transparent guides and grounding the first and second transparent guides, and a conductive portion electrically connecting the first and second transparent guides with each other.

Further features of the present invention will become apparent from the following description of exemplary embodiments with reference to the attached drawings.

DESCRIPTION OF THE EMBODIMENTS

A few exemplary embodiments of the present disclosure will be described in detail below with reference to the drawings. It is noted that sizes, materials, and relative arrangements of components described in the following embodiments do not intend to limit a scope of the invention unless specifically so specified.

First Embodiment

Figure 1:
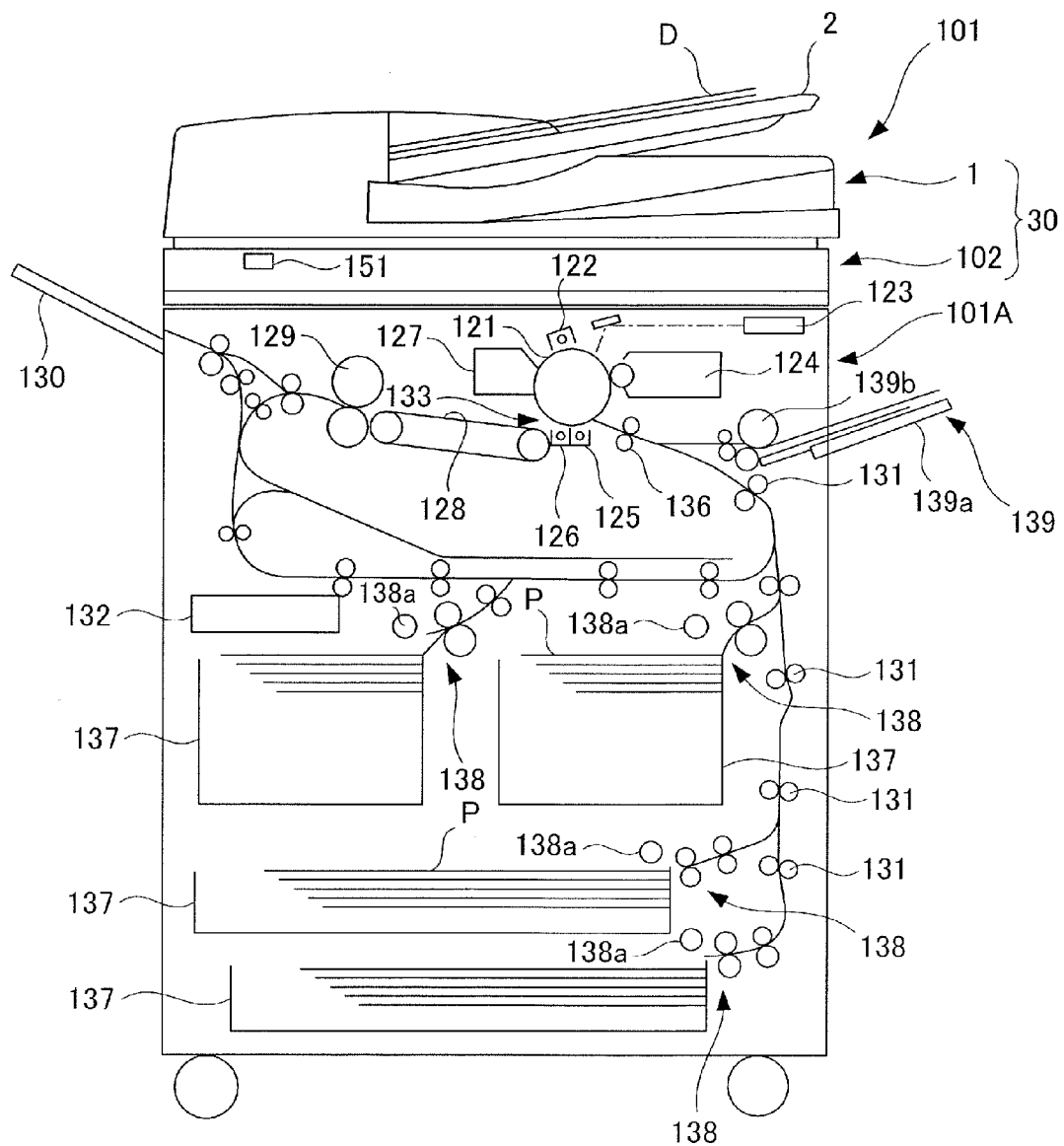
FIG. 1 is a schematic diagram illustrating a configuration of a copier, which is one exemplary image forming apparatus including an image reading apparatus, of a first embodiment.

FIG. 1 is a schematic diagram illustrating a configuration of a copier 101, which is one exemplary image forming apparatus including an image reading apparatus, of a first embodiment. As shown in FIG. 1, an image reading apparatus 30 is disposed above an apparatus body 101A of the copier 101. The image reading apparatus 30 includes a reading apparatus body 102, i.e., a body of an image reading apparatus, in which a first image reading unit is disposed. A first document reading unit 151, i.e., the first image reading unit, reads an image of a document, i.e., a sheet on which the image is formed, by illuminating an image surface of the document with light.

The image reading apparatus 30 includes a document conveyance apparatus 1, i.e., an exemplary sheet conveyance apparatus. The document conveyance apparatus 1, which is openably attached to the reading apparatus body 102, is an auto-document feeder (ADF) configured to convey a document D to an image reading position where an image of the document is read by the first document reading unit 151. The ADF 1 includes a second document reading unit, i.e., a second image reading unit, projecting light to an image surface of the document D to read the document image as described later. That is, the image reading apparatus 30 includes the first and document reading unit 151 and the second document reading unit as the image reading units reading the document images.

The image reading apparatus 30 is configured to read the document by either mode of a feeding-reading mode, i.e., an ADF document reading mode, and a fixed-reading mode, i.e., a platen glass document reading mode, based on user's choice. That is, the feeding-reading mode is a mode in which the document image is read out by passing the document D by the ADF 1 above the first document reading unit 151 and below the second document reading unit. The fixed-reading mode is a mode in which the document image of the document set on the platen glass by the user is read out while moving the first document reading unit 151 in a sub scanning direction. That is, the first document reading unit 151 moves forward and backward while optically scanning the document in the case of the fixed-reading mode. It is noted that the ADF 1, which is attached to the reading apparatus body 102 and turns up and down, is turned upward to place the document on the platen glass in the case of the fixed-reading mode.

The apparatus body 101A includes an image forming portion 133 and a sheet feeding unit 138 feeding a sheet P to the image forming portion 133 located under the image reading apparatus 30. The apparatus body 101A also includes a manual sheet feeding unit 139 provided on a side end part thereof. The image forming portion 133 includes a photosensitive drum 121, a developer 124, a laser scanner unit 123, a cleaner 127, and others.

The sheet feeding unit 138 includes a plurality of sheet storage portions 137 removably attached to the apparatus body 101A and each storing the sheet P such as an overhead projector transparent sheet (OHT), and a pickup roller 138a delivering the sheet P stored in the sheet storage portion 137. The manual sheet feeding unit 139 also includes a tray 139a on which a manually fed sheet P is set and a pickup roller 139b delivering the sheet set on the tray 139a. It is noted that the apparatus body 101A includes a control portion 132 controlling an image forming operation of the image forming portion 133 and a sheet feeding operation of the sheet feeding unit 138 and of the manual sheet feeding unit 139.

Next, an image forming operation of the copier 101 configured as described above will be described. In response to an image read signal outputted from the control portion 132 to the image reading apparatus 30, the ADF 1 conveys the document D, and the document D passes above the first document reading unit 151 and under the second document reading unit in the case when the fixed-reading mode is set. Then, the copier 101 reads the document image of the sheet being conveyed by the document reading unit, converts the read document image into electrical signals, and prepares image data (image information) based on the electrical signal.

The laser scanner unit 123 irradiates a laser beam corresponding to the image data to the photosensitive drum 121. The photosensitive drum 121 is being electrified by the charger 122 in advance and forms an electrostatic latent image upon the irradiation of the laser beam. A toner image is formed on the photosensitive drum 121 by developing the electrostatic latent image by the developer 124.

Meanwhile, in response to a feed signal outputted from the control portion 132 to the sheet feeding unit 138, the sheet P stored in the sheet storage portion 137 is fed out by the pickup roller 138a. After that, the sheet P being fed is conveyed by a conveyance roller 131 to a registration roller pair 136. In the case of the manual sheet feed, the sheet set on the tray 139a is conveyed to the registration roller pair 136 by the pickup roller 139b. Then, after correcting a skew of the sheet by the registration roller pair 136, the sheet is sent to a transfer portion composed of the photosensitive drum 121 and a transfer charger 125 while synchronizing conveyance timing with that of the toner image on the photosensitive drum 121.

The toner image on the photosensitive drum 121 is transferred by the transfer charger 125 onto the sheet sent to the transfer portion, and the sheet is separated from the photosensitive drum 121 by a separation charger 126. It is noted that a surface of the photosensitive drum 121 from which the toner image has been transferred is cleaned by the cleaner 127 and is electrified by the charger 122 to be ready for a next exposure. Then, the sheet onto which the toner image has been transferred is conveyed to a fixing unit 129. The toner image which has been transferred onto the sheet P in a non-fixed state is permanently fixed by undergoing heat and pressure in the fixing unit 129. Then, the sheet onto which the image has been fixed is discharged from the apparatus body 101A to a sheet discharge tray 130.

Figure 2:
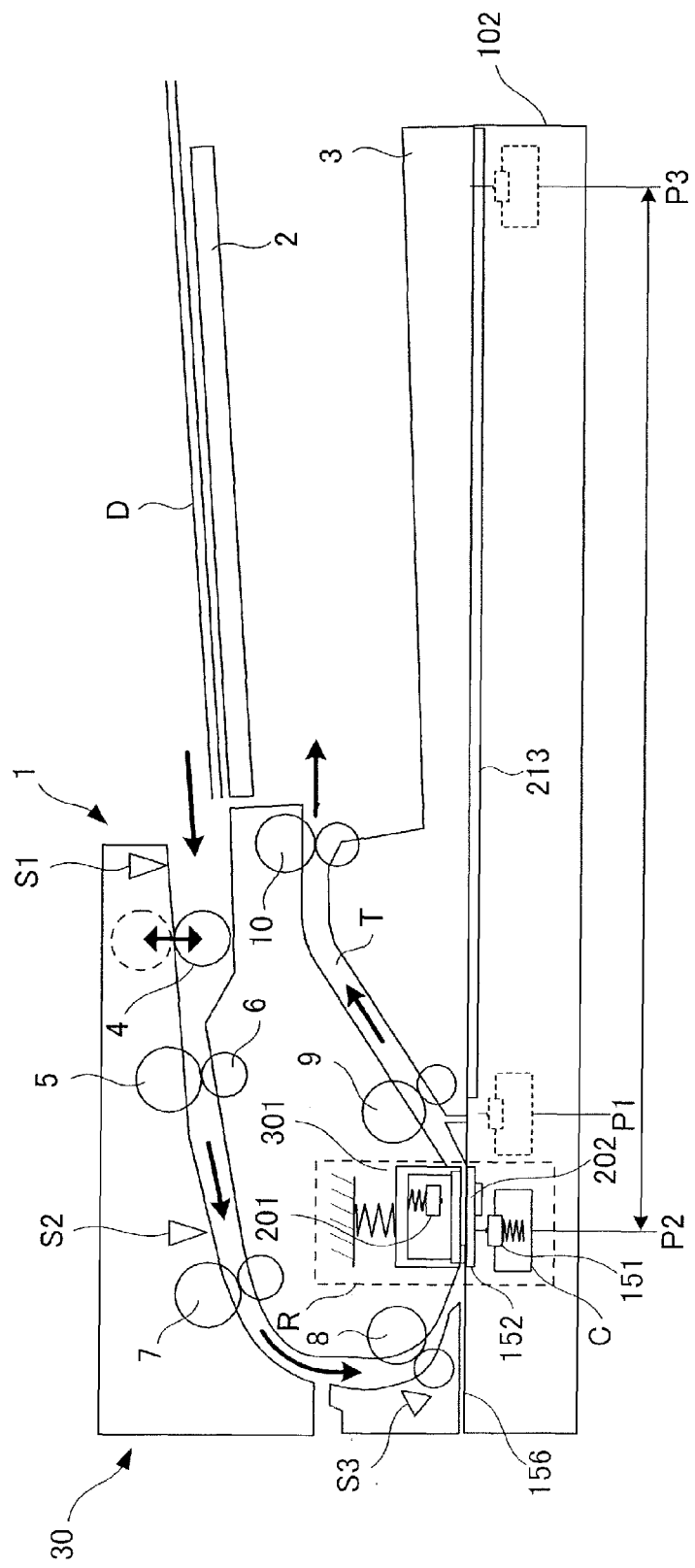
FIG. 2 is a schematic section view illustrating a configuration of the image reading apparatus.

As shown in FIG. 2, a document feeding tray 2 on which the documents D are set in a stack is attached to the ADF 1 while being cantilevered so as to approximately project horizontally. A document discharge tray 3 receiving the documents whose images have been read is disposed under the document feeding tray 2. The document feeding tray 2 and the document discharge tray 3 are disposed so as to face vertically with each other with an appropriate distance in a vertical direction and so as to almost entirely overlap with each other in a plan view.

Provided across and above a conveyance path T through which the document of the ADF 1 is conveyed is a second document reading unit 201 to read the document image. The second document reading unit 201 as described above is used to simultaneously read images formed on both surfaces of the document by the first document reading unit 151 of a reading apparatus body and the second document reading unit 201 in the case of the feeding-reading mode.

A first transparent guide 152 and a second transparent guide 202, each guiding the document D, are disposed along the conveyance path T on respective sides of the conveyance path T, so as to oppose to each other across the conveyance path T. That is to say, the first and second transparent guides 152 and 202 are disposed such that the respective first and second document reading units 151 and 201 read the images formed on the both sides of the document through the first and second transparent guides 151 and 202. Still further, the first document reading unit 151 mounted on a carriage C is configured to move by being guided by a shaft portion not shown.

Then, in the case of the feeding-reading mode, the carriage C is moved to locate the first document reading unit 151 at a feeding-reading position P2. Still further, in the case of the fixed-reading mode, the first document reading unit 151 is moved to a standby position P1 to start reading of the image of the document set on a pressure glass plate 213. The pressure glass plate 213 is a sheet setting table provided downstream of the first transparent guide 152 in a document (sheet) conveying direction. After that, the first document reading unit 151 is moved forward and backward between the standby position P1 and a terminal position P3 to read the image of the document set on the pressure glass plate 213.

The ADF 1 includes a sheet feed roller 4 delivering the document D set on the document feeding tray 2. The ADF 1 also includes a conveyance roller 5 conveying the document D delivered by the sheet feed roller 4 and a retard roller 6 being urged by a spring not shown to be in pressure contact with the conveyance roller 5. The conveyance roller 5 and the retard roller 6 compose a separating portion separating the sheets (documents) conveyed by the sheet feed roller 4 one by one.

The ADF 1 also includes a registration roller pair 7 correcting a skew of the sheet separated by the separating portion. The ADF 1 further includes a first conveyance roller pair 8 sending the sheet whose skew has been corrected by the registration roller pair 7 to an image reading position composed of the first and second document reading units 151 and 201. Still further, the ADF 1 includes a second conveyance roller pair 9 conveying the document whose image has been read and a sheet discharge roller pair 10 discharging the sheet conveyed by the second conveyance roller pair 9 to the document discharge tray 3.

Figure 3:
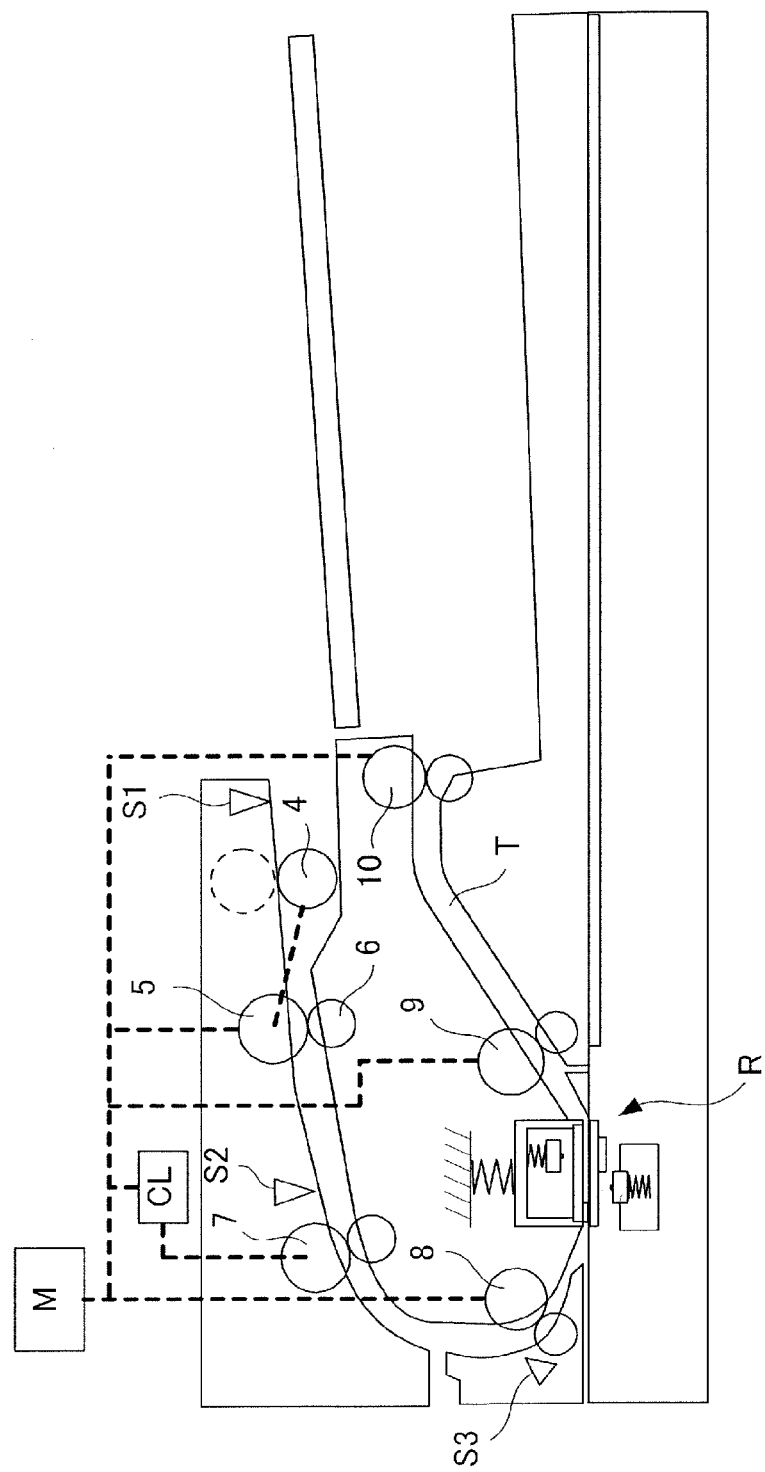
FIG. 3 is a schematic section view illustrating a driving system of an ADF composing the image reading apparatus.

FIG. 3 is a schematic diagram illustrating a driving system of the ADF 1. That is, the conveyance roller 5, the first conveyance roller pair 8, the second conveyance roller pair 9, and the sheet discharge roller pair 10 are rotated by a driving motor M. Still further, while being driven by the driving motor M, the registration roller pair 7 is configured such that the transmission of the drive is cut off by an electromagnetic clutch CL, for example, to stop to rotate for a certain period of time.

Next, the image reading operation of the abovementioned image reading apparatus 30 in the case of the feeding-reading mode will be described. When the user selects the feeding-reading mode, the control portion 132 determines whether or not the document D is set on the document feeding tray 2 through a stacked document detection sensor S1 positioned upstream of the sheet feed roller 4. Then, upon detecting the document D by the stacked document detection sensor S1, the control portion 132 moves the carriage C to move the first document reading unit 151 located at the standby position P1 shown in FIG. 2 to the feeding-reading position P2.

Next, the control portion 132 drives the driving motor M to lower the sheet feed roller 4, while rotating the sheet feed roller 4, from a position indicated by a broken line to a position indicated by a solid line to bring into abutment with the document D, so as to start delivering of the document D. Then, the delivered document D is separated one by one by a friction force between the conveyance roller 5 and the retard roller 6, and the separated document D abuts against the registration roller pair 7 at a front edge thereof.

At the same time, the rotation of the registration roller pair 7 has been stopped because the transmission of the drive of the driving motor M is cut off by the clutch CL. Then, the document D is kept conveyed by the conveyance roller 5 to form a loop in the front end part of the document D, so that a skew of the document D is corrected. In conveying the document D to the registration roller pair 7, the front end of the document D is detected by a first document detection sensor S2 provided upstream of the registration roller pair 7 in the document conveyance direction.

After an elapse of a certain period of time since the detection of the front end of the document D by the first document detection sensor S2, the control portion 132 actuates the clutch CL to transmit the drive of the driving motor M to the registration roller pair 7. Thereby, the registration roller pair 7 rotates and conveys the document D whose skew has been corrected to the first conveyance roller pair 8. The first conveyance roller pair 8 conveys the document D to the image reading portion R where the first and second document reading units 151 and 201 are disposed.

Here, a third document detection sensor S3 detecting the front end of the document D is provided along the conveyance path between the registration roller pair 7 and the first conveyance roller pair 8. Then, based on the timing when the third document detection sensor S3 detects the front end of the document, the control portion 132 starts reading operations of the first and second document reading units 151 and 201.

Figure 7:
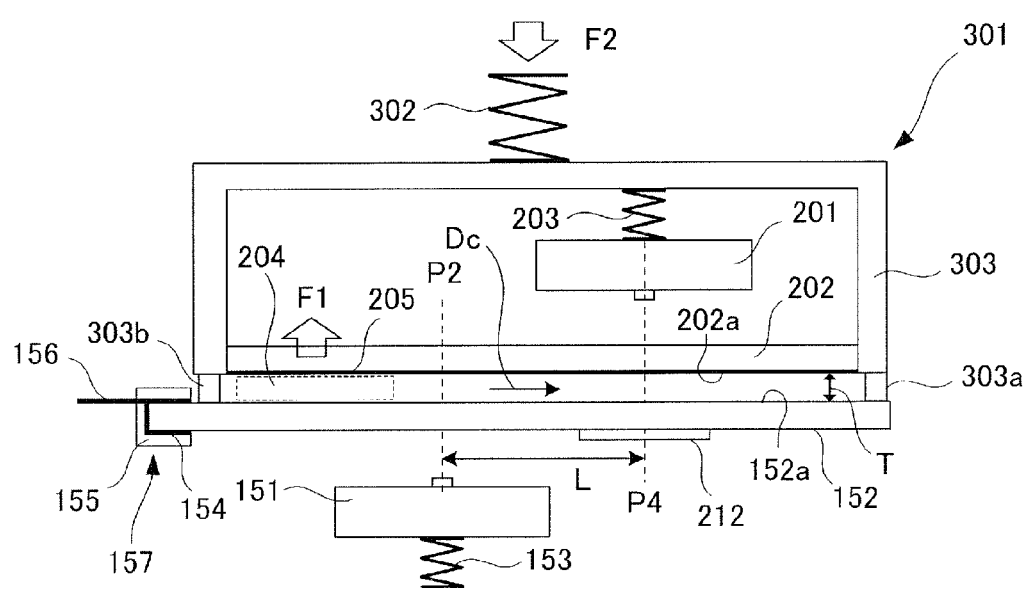
FIG. 7 is an enlarged view of a main part of the image reading apparatus.

Next, the document D is conveyed by the second conveyance roller pair 9 and the images of the both surfaces thereof are read by passing through a feeding-reading position P2 of the first document reading unit 151 and a feeding-reading position P4 of the second document reading unit 201 (see FIG. 7). Then, the document D from which the images have been read is sequentially discharged by the sheet discharge roller pair 10 onto a sheet placing surface of the document discharge tray 3.

Figure 4:
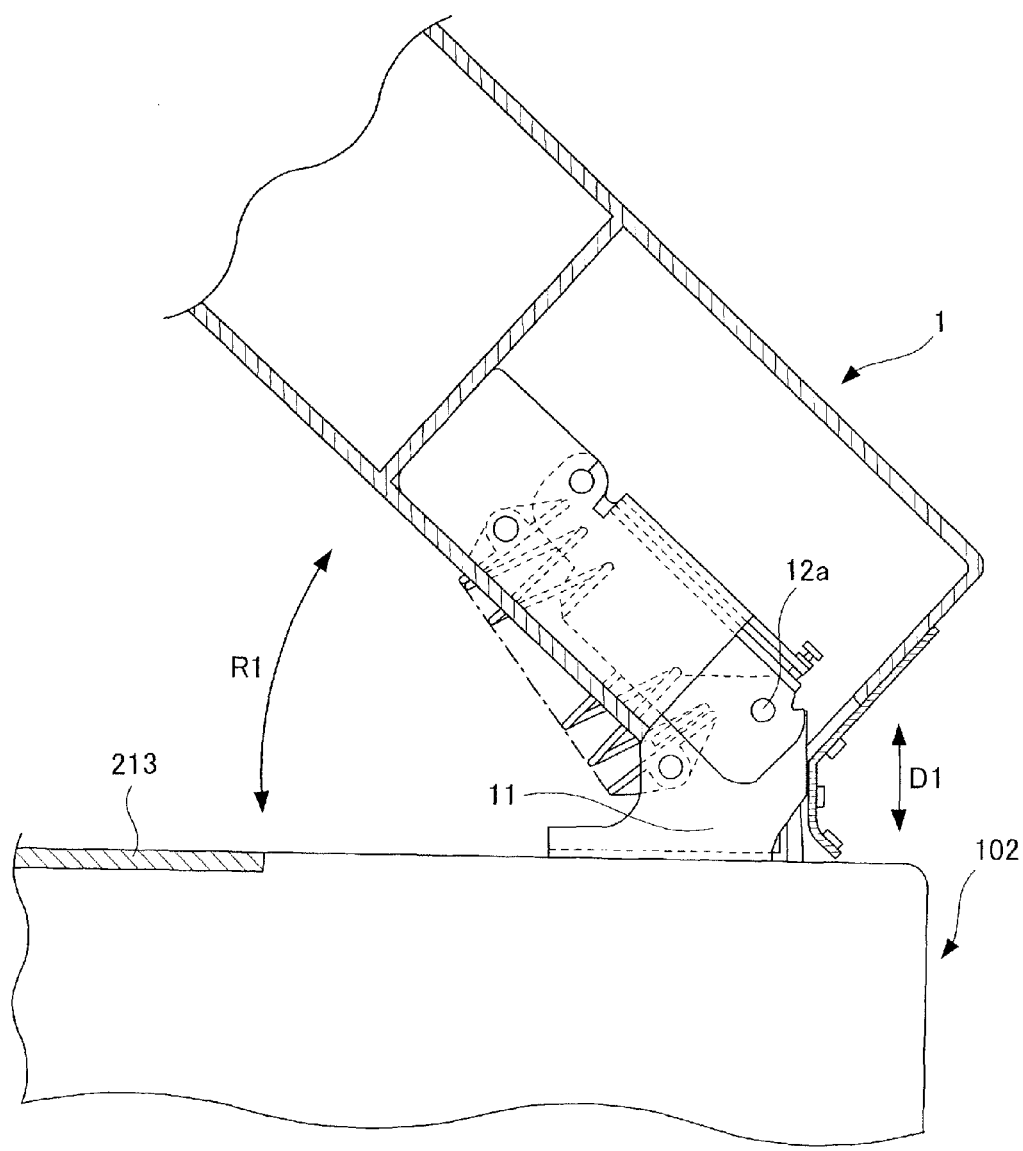
FIG. 4 is a schematic diagram illustrating a hinge mechanism on which the ADF turns up and down.

It is noted that in the case of the fixed-reading mode, the ADF 1 is turned upward on a hinge mechanism 11, i.e., a hinge portion, as shown in FIG. 4 to open an upper part of the reading apparatus body 102 and to place the document on the pressure glass plate 213. After that, when the user closes the ADF 1 and carries out a copying operation, the carriage C shown in FIG. 2 moves and the first document reading unit 151 standing by at the standby position P1 moves to the terminal position P3 while reading the image. The image of the document on the pressure glass plate 213 is read by the first document reading unit 151 moving as described above.

As shown in FIG. 4, the hinge mechanism 11 connects the ADF 1 with the reading apparatus body 102 at a rear side of the reading apparatus body 102 and is configured to turn the ADF 1 up and down in a direction R1 with respect to the reading apparatus body 102 centering on a turning shaft 12*a*. Being supported on the hinge mechanism 11 constructed as described above, the ADF 1 is able to open with respect to the pressure glass plate 213. Still further, the hinge mechanism 11 is attached to the image reading apparatus 30 movably in a vertical direction Dl so as to enable the apparatus to read a thick document.

Figure 5:
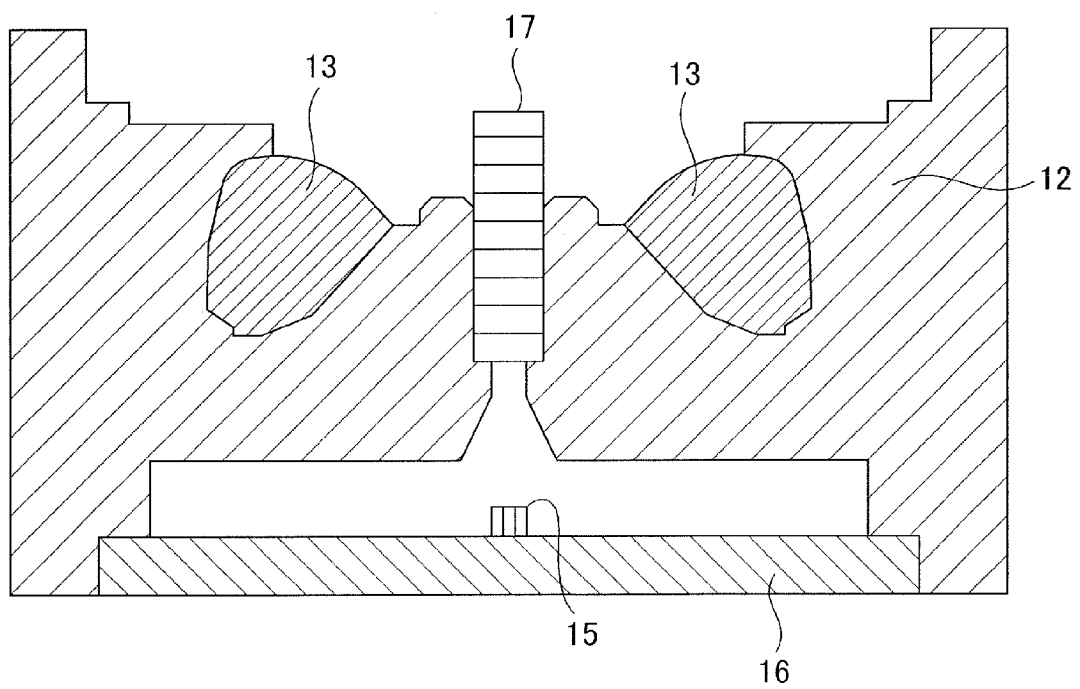
FIG. 5 is a first schematic diagram illustrating a configuration of first and second document reading units provided in the image reading apparatus.
Figure 6:
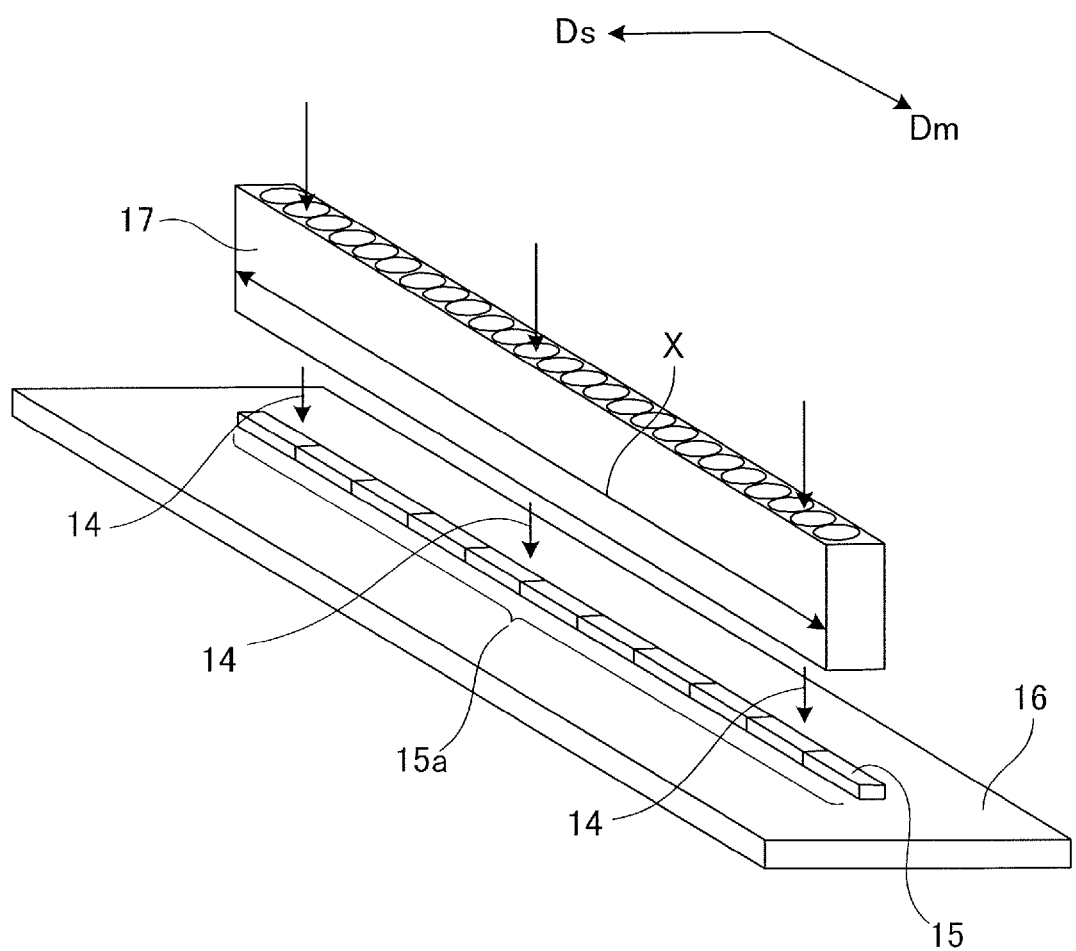
FIG. 6 is a second schematic diagram illustrating the configuration of the first and second document reading units.

By the way, contact image sensors (CIS) are used for the first and second document reading portions 151 and 201 in the present embodiment. As shown in FIGS. 5 and 6, these CISs are provided in a frame 12 and each includes a light source (not shown) using LEDs for illuminating the document and an illuminator composed of a light guide 13. Then, after receiving an output light from the light source by the light guide 13, the illuminator projects the light toward the document by the light guide 13 such that a projected light amount is approximately uniformed across an entire length in a main scanning direction Dm of a document reading area.

The CIS also includes a sensor substrate 16 on which a sensor array 15*a* in which a plurality of photoelectric conversion elements 15 are arrayed in the main scanning direction Dm is mounted. Each photoelectric conversion element 15 includes a plurality of light receiving portions that photoelectrically converts optical images 14, i.e., reflected light from the document, into electrical signals. The CIS also includes a lens array 17 imaging the optical image of the document on the sensor array 15*a*. In the case of a CIS capable of reading an A4 size document and a short-side direction of the document being the main scanning direction Dm for example, the photoelectric conversion elements 15 of about 5100 pixels are arrayed in the sensor array 15*a* to achieve the resolution of 600 dpi (dot per inch).

Here, the image reading area of the CIS for the document means an area within which the photoelectric conversion elements 15 are arrayed. End faces of the photoelectric conversion elements 15 in the main scanning direction Dm are disposed across a width longer than a width of the document by about 3 mm, so as to read an image even if the document is conveyed in a sub scanning direction Ds while being askew. In other words, in the present embodiment, a range in the main scanning direction Dm of the image reading area is defined by a length X in which the photoelectric conversion elements 15 are arrayed in the main scanning direction Dm as shown in FIG. 6.

FIG. 7 is an enlarged view of a main part of the image reading apparatus 30. As shown in FIG. 7, the second document reading unit 201 is stored in a cover module 301 sealed up by the second transparent guide 202 and a sealed guide 303. The second document reading unit 201 is stored in the sealed cover module 301 to prevent paper dust and others, which are generated within the conveyance path along the conveyance of the document, from infiltrating into a gap between the second document reading unit 201 and the second transparent guide 202.

The sealed guide 303 is fixed with the second transparent guide 202 by an adhesive for example to fill a gap between parts where the sealed guide 303 abuts with the second transparent guide 202. The sealed guide 303 is provided with an opening not shown at a part thereof to connect a signal line cable not shown of the second document reading unit 201 with an image processing portion provided within the apparatus body 101A. Herein, a periphery of the opening is covered with a sponge-like elastic member surrounding the signal cable so as to prevent infiltration of the paper dust and others.

The sealed guide 303 includes a pressurizing spring 203 pressing the second document reading unit 201 against the second transparent guide 202. Then, the second document reading unit 201 urged by the pressurizing spring 203 is kept at an adequate focal distance from an upper surface (the second surface) of the document passing through the conveyance path T, with spacers not shown provided at both ends of the second document reading unit 201 abutting with the second transparent guide 202.

The cover module 301 is also pressed in a direction of the first transparent guide 152 by a compression spring 302 connected with an inside of a conveyance frame not shown of the ADF 1. Here, abutting portions 303*a* and 303*b* projects upward on a bottom surface of the sealed guide 303. Then, the cover module 301 urged by the compression spring 302 assures a gap for the conveyance path T formed between the first and second transparent guides 152 and 202 by abutting the abutting portions 303*a* and 303*b* against the first transparent guide 152.

In the present embodiment, the gap between the transparent guides 152 and 202 is set to be 0.9 mm, for example, so as to let a document pass through the gap. Still further, a distance L between the first reading position (P2) of the first document reading unit 151 and the second reading position (P4) of the second document reading unit 201 is set at 15.5 mm for example so that the document reading units 151 and 201 are not influenced from each other by the lightings respectively provided therein.

The first document reading unit 151 is pressed in a direction of the first transparent guide 152 by a compression spring 153 provided on the carriage C. There are spacers not shown attached at both ends of the first document reading unit 151 and abutting with the first transparent guide 152, so that the first document reading unit 151 is kept at an adequate focal distance from a lower surface (first surface opposite from the second surface) of the document passing through the conveyance path T. It is noted that a white sheet member 212 is provided on a back side of the first transparent guide 152 to prevent the second document reading unit 201 from reading a front image through the sheet in reading the back surface of the document of a thin sheet.

Next, an electrical connection structure of the first and second transparent guides 152 and 202 will be described. The first transparent guide 152 includes a guide surface 152*a* to guide the document. The guide surface 152*a* is coated with indium tin oxide (ITO coating), which is an example of conductive material, such that surface resistivity thereof becomes 200 to 500 Ω/cm. Then, as shown in FIG. 7, an aluminum sheet 155 is pasted integrally on an upstream edge part, in a sheet conveyance direction Dc, of the first transparent guide 152 through a conductive double-sided tape 154 from the surface (152*a*) to the back surface of the first transparent guide 152.

Thereby, the aluminum sheet 155 is electrically connected to the guide surface 152a of the first transparent guide 152. Here, the aluminum sheet 155 and the conductive double-sided tape 154 compose a grounding portion 157 grounding the first transparent guide 152. In this case, the aluminum sheet 155 is connected with a conductive casing 156, which is made of conductive material such as a sheet metal, of the reading apparatus body 102. The casing 156 is electrically connected to the reading apparatus body 102. With this configuration connecting the casing 156 with the grounding portion 157, the first transparent guide 152 is grounded through the conductive double-sided tape 154, the aluminum sheet 155, the casing 156, and the reading apparatus body 102.

The second transparent guide 202 includes a guide surface 202a to guide the document. The guide surface 202a is also coated with conductive material similar to the guide surface 152a (ITO coating) such that surface resistivity thereof becomes 200 to 500 Ω/cm. A conductive member 204, i.e., a conductive portion, having elasticity is pasted on the second transparent guide 202 in a vicinity of an edge part thereof. The conductive member 204 includes a core member formed by using urethane foam, i.e., an elastic member, and a conductive film integrated onto an outer surface of the elastic member. The conductive member 204 is pasted on the second transparent guide 202 through a conductive double-sided tape 205.

Figure 8A:
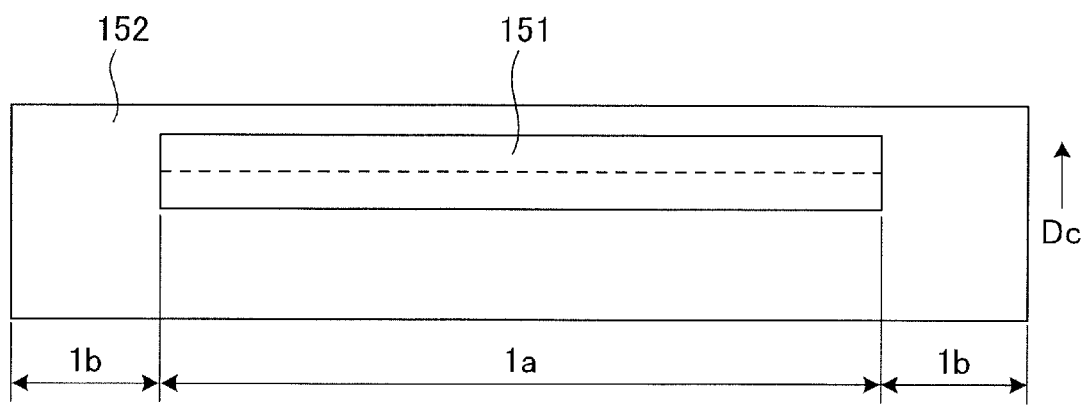
FIG. 8A is a schematic diagram illustrating an image reading area and a non-reading area of the first document reading unit.

Next, an area where the conductive member 204 is attached will be described. FIG. 8A is a schematic diagram illustrating the first document reading unit 151 viewed through the first transparent guide 152. An image reading area 1a of the first document reading unit 151 shown in FIG. 8A is designed to be larger than a maximum size (widthwise size) of the documents to be conveyed by the ADF 1. It is noted that a dot line in FIG. 8A represents a reading middle of the first document reading unit 151, that is, a line passing through the optical axes of lens array 17. Non-reading areas 1b are provided on widthwise both sides, in a width direction orthogonal to the sheet conveyance direction Dc, of the image reading area 1a of the first document reading unit 151.

Figure 8B:
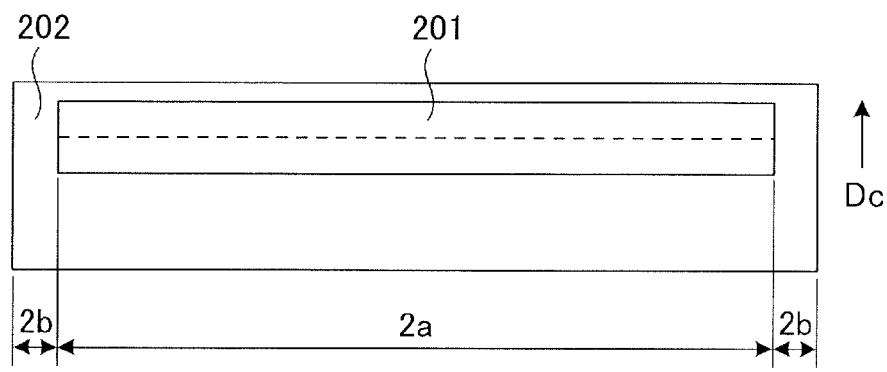
FIG. 8B is a schematic diagram illustrating an image reading area and a non-reading area of the second document reading unit.

FIG. 8B is a schematic diagram illustrating the second document reading unit 201 viewed through the second transparent guide 202. An image reading area 2a of the second document reading unit 201 shown in FIG. 8B is designed to be larger than a maximum size (widthwise size) of the documents to be conveyed by the ADF 1. A dot line in FIG. 8B represents a reading middle of the second document reading unit 201, and non-reading areas 2b are provided on widthwise both sides of the image reading area 2a of the second document reading unit 201. It is noted that a widthwise length of the image reading areas 1a and 2a corresponds to the length X, which is an array length of the photoelectric conversion elements 15 disposed in the CIS shown in FIG. 6.

In general, the image reading area 1a of the first document reading unit 151 and the image reading area 2a of the second document reading unit 201 are designed to be approximately equal in width. Meanwhile, in the present embodiment, an area of the first transparent guide 152 is set to be larger than that of the second transparent guide 202 as shown in FIGS. 8A and 8B in order to assure the electrical connection path as well as the document conveyance path T.

Still further, the conductive member 204 shown in FIG. 7 is pasted at least one of the non-reading areas 2b of the second document reading unit 201 within the second transparent guide 202 so as not to interfere the passage of the document. The conductive member 204 is pasted at a position on which the conductive member abuts with a corresponding non-reading area 1b of the first document reading unit 151 within the first transparent guide 152 when the ADF 1 is closed.

It is noted that the second transparent guide 202 in the present embodiment is integrated with the sealed guide 303 as already described above. Therefore, when the ADF 1 is closed, the abutting portions 303a and 303b provided upstream and downstream of the sealed guide 303 in the sheet conveyance direction Dc as shown in FIG. 7 come to abut with the first transparent guide 152, with the conveyance path T being formed. Here, the abutting portions 303a and 303b are provided so as to abut respectively with the non-reading areas 1b and 1b of the first document reading unit 151 so as not to hinder the conveyance of the document passing through the conveyance path.

Thereby, when the ADF 1 is closed, the abutting portions 303a and 303b come to abut with the both non-reading areas 1b and 1b of the first document reading unit 151, and the conductive member 204 comes to abut with at least one of the both non-reading areas 1b and 1b in an area other than the area with which the abutting portions 303a and 303b are in contact. Because the abutting portions 303a and 303b and the conductive member 204 are located at the non-reading areas 1b and 2b of the first and second transparent guides 152 and 202 when the ADF 1 is closed as described above, they do not interfere the passage of the document being conveyed.

A thickness of the conductive member 204 is set to be larger than a distance in a height direction of the conveyance path T, i.e., a vertical distance between the transparent guides 152 and 202. Therefore, in a closing operation of the ADF 1, the conductive member 204 abuts with the first transparent guide 152 at first, and the conductive member 204 is brought into pressure contact with the first transparent guide 152 along with proceeding of the closing operation. When the ADF 1 being completely closed such that the abutting portions 303a and 303b abut with the first transparent guide 152, the conductive member 204 is compressed between the first and second transparent guides 152 and 202.

Thereby, the second transparent guide 202 is electrically connected with the first transparent guide 152 through the conductive member 204. Then, by electrically connecting the second transparent guide 202 with the first transparent guide 152 as described above, the second transparent guide 202 is grounded through the conductive member 204, the first transparent guide 152, the grounding portion 157, and the casing 156 of the reading apparatus body 102.

Here, when the transparent guides 152 and 202 are grounded, electrostatic attraction force acting among the document D, foreign matters, the first and second transparent guides 152 and 202 is sufficiently reduced, and the force caused by friction becomes dominant. In this case, since the friction force between the document D and the foreign matters is stronger than the friction force between the foreign matters and the first and second transparent guides 152 and 202 in general, the foreign matters are conveyed together with the document D. This arrangement makes it possible to prevent a striped image by reducing the amount of foreign matters staying on the first and second transparent guides 152 and 202.

Here, when the ADF 1 is closed while compressing the conductive member 204, a repulsive force F1 caused by the compression of the conductive member 204 is added to the sealed guide 303. If the conductive member 204 cannot be brought into pressure contact with the first transparent guide 152 due to this repulsive force F1, it is conceivable a case when the conduction between the second transparent guide 202 and the first transparent guide 152 is not assured. Due to that, a pressing force F2 of the compression spring 302 and a weight of the cover module 301 are set so that the conductive member 204 is brought into pressure contact with the first transparent guide 152 regardless of the repulsive force F1 caused by the compression of the conductive member 204.

As described above, according to the present embodiment, the conductive member 204 is provided on the second transparent guide 202, and the second transparent guide 202 is electrically connected with the first transparent guide 152 through the conductive member 204. Because this arrangement makes it possible to ground the second transparent guide 202 of the ADF 1 without using any ground line, it is possible to ground the second transparent guide 202 with the simple configuration while avoiding increase in both cost and size of the reading apparatus body 102.

It is noted that while the conductive member 204 is formed of the urethane foam and the conductive film in the present embodiment, a conductive rubber or a brush-like conductive member, in which 50 to 100 wire rods such as stainless wires having a diameter of around 12 μm are bundled, may be used for the conductive member 204 for example.

Still further, while the conductive member 204 is pasted on the second transparent guide 202 in the present embodiment, the conductive member 204 may be provided on the first transparent guide 152. That is, the conductive member 204 may be provided on at least one of the first and second transparent guides 152 and 202. When the conductive member 204 is provided on the first transparent guide 152, it is preferable to paste the conductive member 204 in the non-reading area 1b of the first document reading unit 151 of the first transparent guide 152. Still further, it is preferable to arrange such that the conductive member 204 abuts with the non-reading area 2b of the second document reading unit 201 of the second transparent guide 202 when the ADF 1 is closed.

Still further, while the conductive member 204 is pasted on a part of the non-reading area 2b of the second document reading unit 201 of the second transparent guide 202 in the present embodiment, the conductive member 204 may be pasted on the second transparent guide 202 in an entire area of the non-reading area 2b of the second document reading unit 201.

Second Embodiment

Figure 9:
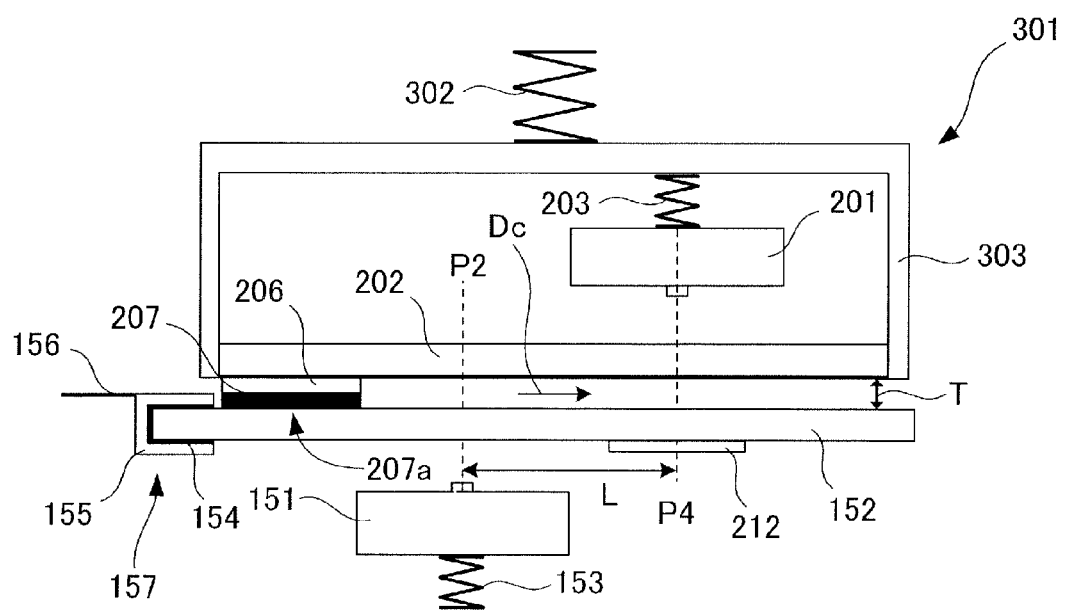
FIG. 9 is an enlarged view of a main part of an image reading apparatus of a second embodiment.

Next, an image reading apparatus of a second embodiment of the present disclosure will be described. FIG. 9 is an enlarged view of a main part of the image reading apparatus of the present embodiment. In FIG. 9, the same reference numerals with those in FIG. 7 denote the same or corresponding components.

In the present embodiment, an aluminum sheet 207, i.e., a conductive sheet member, is pasted on the second transparent guide 202 in the non-reading area 2b (see FIG. 8B) of the second document reading unit 201 through a conductive double-sided tape 206 as shown in FIG. 9. Thus, the aluminum sheet 207 is electrically connected with the surface of the second transparent guide 202. That is, the second transparent guide 202 is provided with a conductive portion 207a composed of the aluminum sheet 207 and the conductive double-sided tape 206 in the present embodiment.

Still further, the present embodiment is configured such that the document conveyance path T is formed of the aluminum sheet 207 and the conductive double-sided tape 206. That is, the document conveyance path T is formed by the aluminum sheet 207 and the conductive double-sided tape 206 without providing an abutting portion on the sealed guide 303 in the present embodiment. The aluminum sheet 207 is around 35 μm to 500 μm thick, and a total thickness combined with a thickness of the conductive double-sided tape 206 is about 65 μm to 900 μm, for example. In a case when the width of the conveyance path T is set at 0.9 mm in the present embodiment, it is preferable to set the thickness of the aluminum sheet to be 500 μm and the thickness of the conductive double-sided tape to be 400 μm for example.

This arrangement causes the aluminum sheet 207 to abut with the non-reading area 1b (see FIG. 8A) of the first document reading unit 151 of the first transparent guide 152 when the ADF 1 is closed. Thereby, the second transparent guide 202 is electrically connected with the first transparent guide 152 through the conductive double-sided tape 206 and the aluminum sheet 207. As a result, the second transparent guide 202 is grounded through the conductive double-sided tape 154 and the aluminum sheet 155 pasted on the first transparent guide 152, the casing 156, and the reading apparatus body 102.

As described above, according to the present embodiment, the second transparent guide 202 is provided with the conductive portion 207a composed of the aluminum sheet 207 and the conductive double-sided tape 206. Then, the document conveyance path T is formed and the second transparent guide 202 is electrically connected with the first transparent guide 152 by the conductive portion 207a. This arrangement makes it possible to obtain the similar effect with that of the first embodiment and to simplify the structure of the sealed guide 303 because it is not necessary to provide the abutting portions on the sealed guide 303.

It is noted that while the conductive double-sided tape 206 and the aluminum sheet 207 are attached to the second transparent guide 202 in the present embodiment, the conductive double-sided tape 206 and the aluminum sheet 207 may be provided on the first transparent guide 152. That is, the conductive double-sided tape 206 and the aluminum sheet 207 may be provided at least one of the first and second transparent guides 152 and 202.

Figure 10:
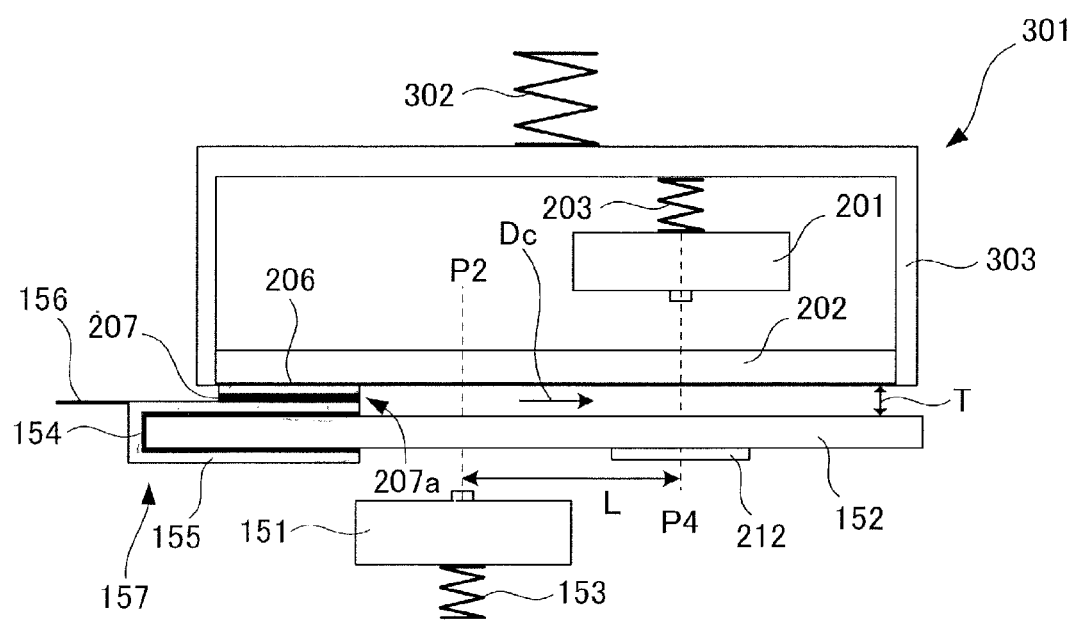
FIG. 10 is an enlarged view of a main part of a modified example of the second embodiment.

Still further, while the second transparent guide 202 is electrically connected with the first transparent guide 152 by causing the aluminum sheet 207 to abut with the first transparent guide 152 in the example shown in FIG. 9, the present embodiment is not limited to this configuration. For instance, as shown in FIG. 10, the similar effect can be obtained by causing the aluminum sheet 207 to abut with the aluminum sheet 155 of the grounding portion 157 pasted on the first transparent guide 152. In this case, thicknesses of the aluminum sheets 155 and 207 are set respectively to be 250 μm, and thicknesses of the conductive double-sided tapes 154 and 206 are set respectively to be 200 μm, for example, so as to allow the document passage.

Still further, while the aluminum sheet is used as the conductive sheet member in the present embodiment, a rolled copper foil or an electrolytic copper foil, for example, may be used as long as they has adequate conductivity. Still further, the conductive sheet member may be provided on the second transparent guide 202 in any position of the non-reading area 2b of the second document reading unit 201 (see FIG. 8B). It is also possible to arrange such that the aluminum sheet 207 abuts securely with the first transparent guide 152 by taking a balance with the pressing force of the compression spring 302 by pasting the aluminum sheet on the second transparent guide 202 in an entire area of the non-reading area 2b of the second document reading unit 201.

Third Embodiment

Figure 11:
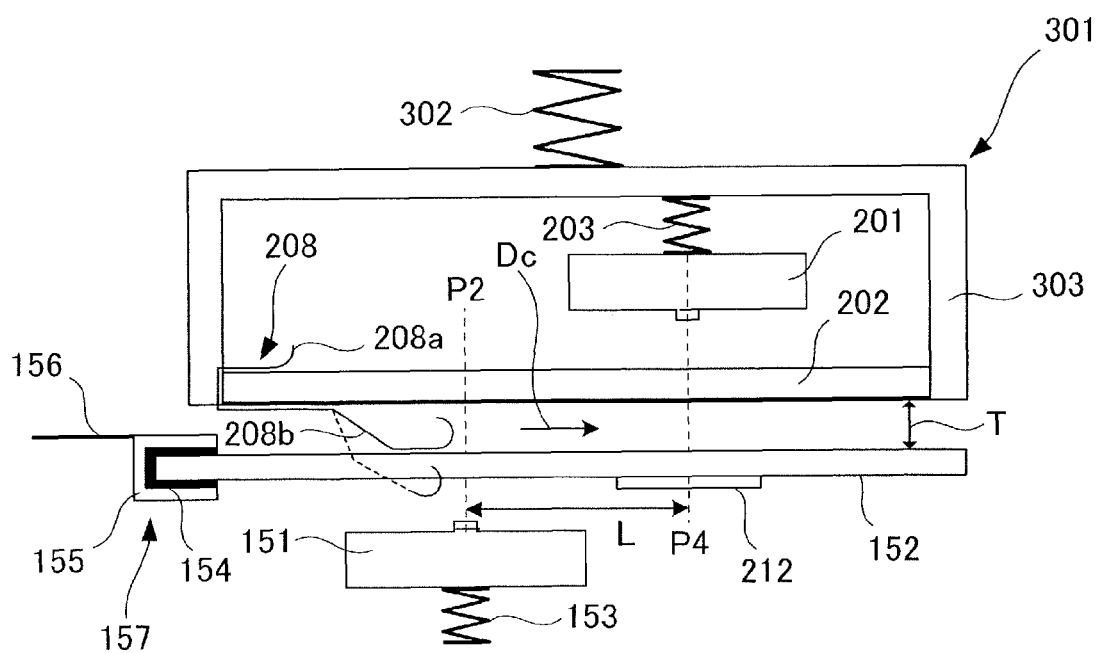
FIG. 11 is an enlarged view of a main part of an image reading apparatus of a third embodiment.

Next, an image reading apparatus of a third embodiment of the present disclosure will be described. FIG. 11 is an enlarged view of a main part of the image reading apparatus of the present embodiment. In FIG. 11, the same reference numerals with those in FIG. 7 denote the same or corresponding components.

In the present embodiment, as shown in FIG. 11, a plate-like member 208, which is a conductive elastic member serving as a conductive portion, is attached to the second transparent guide 202 in the non-reading area 2b of the second document reading unit 201 (see FIG. 8B). The plate-like member 208 includes a pinch portion 208a pinching an end portion of the second transparent guide 202 provided at one end thereof and a tongue piece 208b extending toward the first transparent guide 152 provided at another end thereof.

When the ADF 1 is closed, the tongue piece 208b displaces upward with respect to the second transparent guide 202 from a position indicated by a dot line to a position indicated by a solid line by abutting with and following the surface of the first transparent guide 152. Thereby, the plate-like member 208 abuts with the first transparent guide 152 with adequate abutment pressure. As a result, the second transparent guide 202 is electrically connected with the first transparent guide 152 through the plate-like member 208. Then, the second transparent guide 202 is grounded through the conductive double-sided tape 154 and the aluminum sheet 155 pasted on the first transparent guide 152, the casing 156 and the reading apparatus body 102.

When the ADF 1 is closed, a tip portion of the tongue piece 208b of the plate-like member 208 displaced upward abuts with the second transparent guide 202, so that the distance between the first and second transparent guides 152 and 202 is kept so adequate that the documents smoothly pass.

As described above, according to the present embodiment, the plate-like member 208, i.e., the conductive elastic member, is provided on the second transparent guide 202 to electrically connect the second transparent guide 202 with the first transparent guide 152 through the plate-like member 208. This arrangement makes it possible to obtain the similar effect with the first embodiment.

It is noted that while the plate-like member is used as an exemplary conductive elastic member in the present embodiment, it is also possible to use the elastic member other than a plate-like member, a wire rod such as a compression spring, for example. In this case, stainless steel, such as SUS steel in JIS standard, is suitable as a material of the elastic member (a stainless steel belt or a stainless wire). Still further, it is sufficient to provide the plate-like member 208 on at least one of the first and second transparent guides 152 and 202.

By the way, the first through third embodiments described above are the case in which the casing is formed of the conductive member such as a sheet metal and in which the first and second transparent guides 152 and 202 are grounded through the casing. However, it is also conceivable to form the casing of the image reading apparatus by using such materials as acrylonitrile butadiene styrene (ABS) and polycarbonate (PC)+ABS in order to lighten the image reading apparatus. In such a case, the method of grounding the first and second transparent guides 152 and 202 through the casing cannot be used. Therefore, in a case where the casing of the image reading apparatus is formed of a resin material that is not conductive, the first and second transparent guides 152 and 202 are required to be grounded without passing through the casing.

Fourth Embodiment

Figure 12:
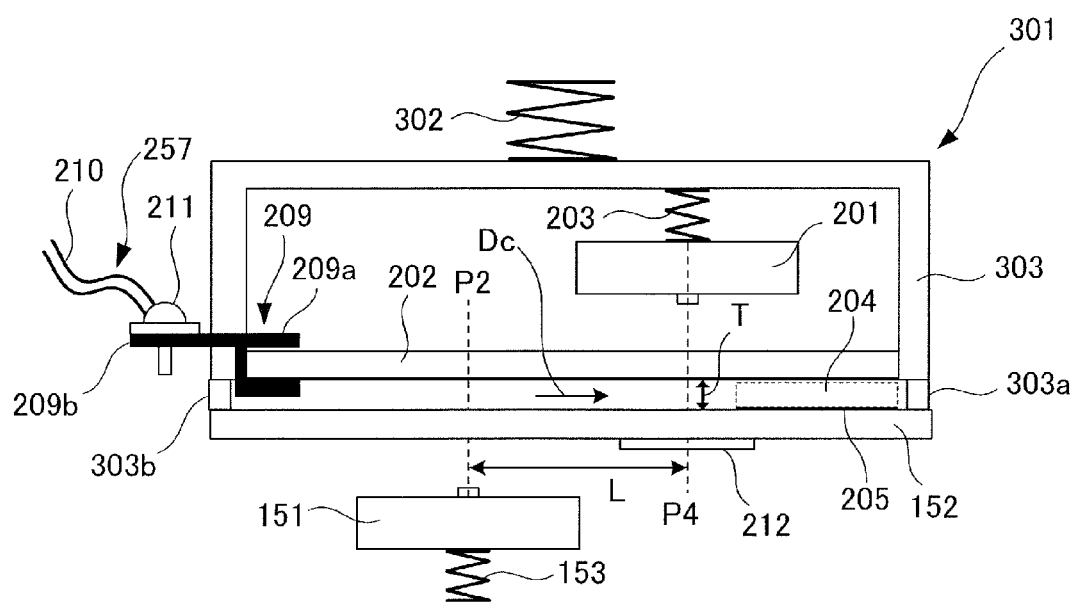
FIG. 12 is an enlarged view of a main part of an image reading apparatus of a fourth embodiment.

Next, an image reading apparatus configured such that the first and second transparent guides 152 and 202 are grounded without passing through the casing of the image reading apparatus will be described as a fourth embodiment of the present disclosure. FIG. 12 is an enlarged view of a main part of the image reading apparatus of the present embodiment. In FIG. 12, the same reference numerals with those in FIG. 7 denote the same or corresponding components.

According to the present embodiment, the guide surface of the first transparent guide 152 is coated with a conductive material. The conductive member 204, which is similar to that of the first embodiment for example, is pasted on the first transparent guide 152 through a conductive double-sided tape 205. Meanwhile, the guide surface of the second transparent guide 202 is also coated with conductive material. Attached to the second transparent guide 202 is a grounding member 209 composing a grounding portion 257 for grounding the second transparent guide 202.

Here, the grounding member 209 is a plate-like conductive member and is provided with a clip portion 209a formed at one end thereof. The grounding member 209 is fixed to the second transparent guide 202 such that the clip portion 209a pinches the second transparent guide 202. The grounding member 209 is also provided with a fixing portion 209b for fixing a grounding line 210 and others with a screw 211. It is noted that the grounding line 210 is connected through the hinge mechanism 11 shown in FIG. 4 by passing through the inside of the ADF 1. Here, the hinge mechanism 11 is connected with a conductive casing portion not shown of the apparatus body 101A, that is, a conductive casing portion of the apparatus body, e.g., a metal frame of the apparatus body, of the copier 101.

By constructing as described above, the conductive member 204 abuts with the second transparent guide 202 when the ADF 1 is closed, and the first transparent guide 152 is thus electrically connected with the second transparent guide 202 in the present embodiment. Then, because the first transparent guide 152 is electrically connected with the second transparent guide 202, the first transparent guide 152 is grounded through the conductive member 204, the grounding member 209, the grounding line 210, the hinge mechanism 11, and the conductive casing portion of the apparatus body 101A. Here, the abutting portions 303a and 303b of the sealed guide 303 abut with the second transparent guide 202 so that the gap of the conveyance path T is assured. Still further, the conductive member 204 is provided so as to abut with a part other than parts of the second transparent guide 202 with which the abutting portions 303a and 303b abut.

As described above, according to the present embodiment, the conductive member 204 is provided on the first transparent guide 152 and the second transparent guide 202 is grounded through the grounding member 209, the grounding line 210, the hinge mechanism 11, and the conductive casing portion not shown of the apparatus body 101A. The conductive member 204 electrically connects the first transparent guide 152 with the second transparent guide 202. This arrangement makes it possible to ground the first and second transparent guides 152 and 202, even if the casing of the reading apparatus body 102 is formed of a resin material, without using the casing and to obtain the similar effect with that of the first embodiment.

Fifth Embodiment

Figure 13:
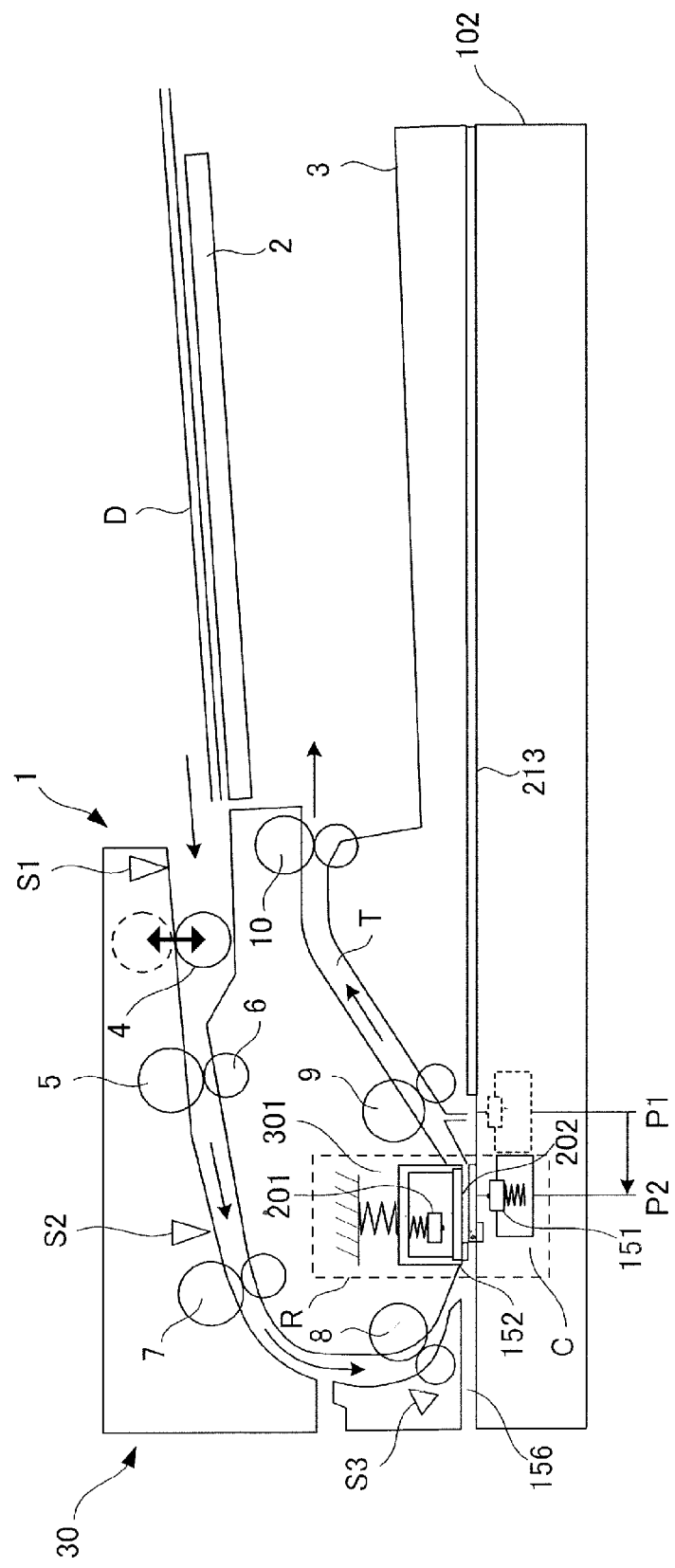
FIG. 13 is a schematic diagram illustrating a configuration of an image reading apparatus of a fifth embodiment.

Next, an image reading apparatus of a fifth embodiment of the present disclosure will be described. FIG. 13 is a schematic diagram illustrating a configuration of the image reading apparatus of the present embodiment. It is noted that in FIG. 13, the same reference numerals with those in FIG. 2 denote the same or corresponding components.

In the present embodiment, the first document reading unit 151 is disposed downstream of the second document reading unit 201 in a sheet conveyance direction. Therefore, differing from the modes of the first through fourth embodiments, reading of the images of the document starts in order from the back surface to the front surface in the present embodiment.

Here, since the first document reading unit 151 is disposed downstream of the second document reading unit 201 in the sheet conveyance direction, a distance from the standby position P1 of the first document reading unit 151 to the feeding-reading position P2 is shortened. Therefore, in reading while moving the document by the ADF 1, a moving distance of the first document reading unit 151 is shortened and a time from an operation made by the user until when the feeding-reading operation is started is shortened as compared to the embodiments described above.

Figure 14:
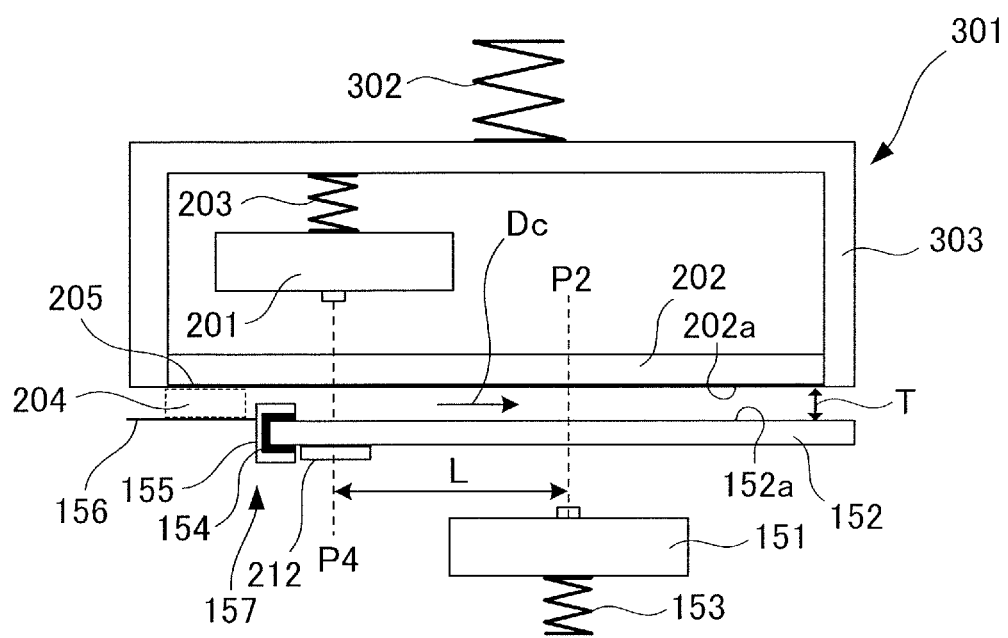
FIG. 14 is an enlarged view of a main part of the image reading apparatus of the fifth embodiment.
Figure 15:
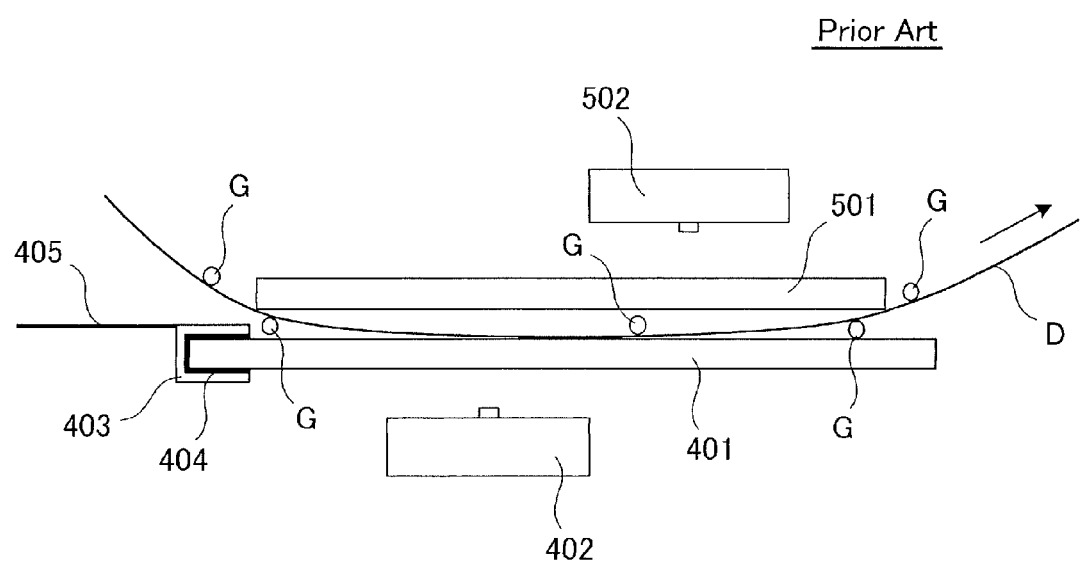
FIG. 15 is a schematic diagram illustrating an image reading apparatus of a prior art.

As shown in FIG. 14, according to the present embodiment, the guide surface 152a of the first transparent guide 152 is coated with conductive material, and the first transparent guide 152 is electrically connected by directly abutting with the casing 156 composed of a conductive member. Meanwhile, the guide surface 202a of the second transparent guide 202 is coated with conductive material, and the conductive member 204 having elasticity is pasted on the surface of the second transparent guide 202 integrally with the conductive double-sided tape 205.

When the ADF 1 is closed, the conductive member 204 comes to abut with the casing 156 of the reading apparatus body 102, and the second transparent guide 202 is electrically connected with the casing 156 and is grounded through the casing 156 and the reading apparatus body 102.

As described above, according to the present embodiment, the first document reading unit 151 is disposed upstream of the second document reading unit 201 in the sheet conveyance direction, so that the time from the operation made by the user until the start of the feeding-reading operation can be shortened. Still further, the conductive member 204 is provided on the second transparent guide 202, and the second transparent guide 202 is grounded by abutting the conductive member 204 with the casing 156 of the reading apparatus body 102. This arrangement makes it possible to obtain the similar effect with that of the first embodiment.

While the CISs are used for the first and second image reading units in the first through fifth embodiments as described above, it is also possible to use an image reading unit other than the CIS system for at least one of the first and second image reading units. For instance, the image reading apparatus body may include a first image reading unit that includes a CCD unit, which convert light intensity into electrical signal, and a mirror unit, which reflects light from the document image toward the CCD and is moved to the standby position P1 and the feeding-reading position P2.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-114754, filed on Jun. 5, 2015, which is hereby incorporated by reference herein in its entirety.

What is claimed is:

1. An image reading apparatus comprising:
a first image reading unit configured to read an image on a first surface of a sheet passing through a conveyance path;
a second image reading unit provided on a side opposite to the first image reading unit across the conveyance path and configured to read an image on a second surface opposite to the first surface of the sheet;
a first transparent guide disposed along the conveyance path such that the first image reading unit reads the image on the first surface through the first transparent guide, the first transparent guide comprising a guide surface coated with conductive material and guiding the sheet passing through the conveyance path;
a second transparent guide disposed along the conveyance path to oppose to the first transparent guide across the conveyance path such that the second image reading unit reads the image on the second surface through the second transparent guide, the second transparent guide comprising a guide surface coated with conductive material and guiding the sheet passing through the conveyance path;
a grounding member provided on the first transparent guide and grounding the first transparent guide; and
a conductive member provided on one of the first and second transparent guides and configured to abut with the other of the first and second transparent guides on an outside, in a width direction orthogonal to a sheet conveying direction, of an area where the sheet is conveyed in the sheet conveying direction, so as to electrically connect the one of the first and second transparent guides with the other of the first and second transparent guides,
wherein the second transparent guide is grounded through the conductive member, the first transparent guide, and the grounding portion.

2. The image reading apparatus according to claim 1, wherein the grounding member is electrically connected with the guide surface of the first transparent guide.

3. The image reading apparatus according to claim 1, further comprising a sheet conveying apparatus configured to convey the sheet through the conveyance path,
wherein a length in the width direction of the area where the sheet is conveyed in the sheet conveying direction is set larger than a maximum size among sizes of sheets conveyed by the sheet conveying apparatus.

4. The image reading apparatus according to claim 1, wherein the conductive member comprises an elastic member with a conductive film wrapping around a surface of the elastic member.

5. The image reading apparatus according to claim 1, wherein the conductive member comprises a conductive sheet member.

6. The image reading apparatus according to claim 1, wherein the conductive member comprises a conductive elastic member.

7. The image reading apparatus according to claim 1, wherein the conductive member keeps a gap between the first and second transparent guides so as to allow the sheet to pass through the gap.

8. The image reading apparatus according to claim 1, wherein the conductive member is provided outside, in the width direction, of image reading areas of the first and second image reading units, the image reading areas being areas where the first and second image reading units read images of the sheet being conveyed.

9. The image reading apparatus according to claim 1, further comprising
a body, and
a sheet conveying apparatus attached openably to the body and configured to convey the sheet,
wherein the first transparent guide and the first image reading unit are disposed in the body, and the second transparent guide and the second image reading unit are disposed in the sheet conveying apparatus.

10. The image reading apparatus according to claim 9, further comprising a hinge portion supporting the sheet conveying apparatus openably with respect to the body,
wherein the first transparent guide disposed in the body is grounded through the hinge portion.

11. The image reading apparatus according to claim 9, further comprising a stacking table, on which a sheet is stacked, disposed downstream in the sheet conveying direction of the first transparent guide of the body,
wherein the first image reading unit is movable to a first position to read the image of the sheet set on the stacking table and to a second position to read the image of the sheet with the sheet being conveyed by the sheet conveying apparatus, and
wherein the second position is disposed downstream in the sheet conveyance direction of a position on which the second image reading unit in the sheet conveying apparatus reads the image on the sheet.

12. The image reading apparatus according to claim 1, further comprising a body,
wherein the grounding member is electrically connected with a casing of the body, and
wherein the conductive member is configured to abut with the casing of the body.

13. An image forming apparatus comprising:
an image reading apparatus configured to read an image of a sheet; and
an image forming portion configured to form an image based on image information read through the image reading apparatus,
wherein the image reading apparatus comprises
a first image reading unit configured to read an image on a first surface of a sheet passing through a conveyance path,
a second image reading unit provided on a side opposite to the first image reading unit across the conveyance path and configured to read an image on a second surface opposite to the first surface of the sheet,
a first transparent guide disposed along the conveyance path such that the first image reading unit reads the image on the first surface through the first transparent guide, the first transparent guide comprising a guide surface coated with conductive material and guiding the sheet passing through the conveyance path,
a second transparent guide disposed along the conveyance path to oppose to the first transparent guide across the conveyance path such that the second image reading unit reads the image on the second surface through the second transparent guide, the second transparent guide comprising a guide surface coated with conductive material and guiding the sheet passing through the conveyance path,
a grounding member provided on the first transparent guide and grounding the first transparent guide, and
a conductive member provided on one of the first and second transparent guides and configured to abut with the other of the first and second transparent guides on an outside, in a width direction orthogonal to a sheet conveying direction, of an area where the sheet is conveyed in the sheet conveying direction, so as to electrically connect the one of the first and second transparent guides with the other of the first and second transparent guides,
wherein the second transparent guide is grounded through the conductive member, the first transparent guide, and the grounding portion.

* * * * *